US010919570B2

(12) United States Patent
Kim

(10) Patent No.: US 10,919,570 B2
(45) Date of Patent: Feb. 16, 2021

(54) APPARATUS AND METHOD FOR CONTROLLING STEERING OF VEHICLE

(71) Applicant: MANDO CORPORATION, Gyeonggi-do (KR)

(72) Inventor: Jung-Yeol Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 145 days.

(21) Appl. No.: 16/205,204

(22) Filed: Nov. 29, 2018

(65) Prior Publication Data
US 2019/0270481 A1 Sep. 5, 2019

(30) Foreign Application Priority Data
Mar. 5, 2018 (KR) .......................... 10-2018-0025681

(51) Int. Cl.
*B62D 6/00* (2006.01)
*B62D 15/02* (2006.01)
*B62D 5/04* (2006.01)

(52) U.S. Cl.
CPC ........... *B62D 6/001* (2013.01); *B62D 5/0469* (2013.01); *B62D 15/02* (2013.01); *B62D 15/025* (2013.01)

(58) Field of Classification Search
CPC .......... B62D 6/00; B62D 6/001; B62D 15/02; B62D 15/025; B62D 5/0469
USPC ........................................................ 701/41
See application file for complete search history.

(56) References Cited

U.S. PATENT DOCUMENTS

| 2005/0082106 A1 | 4/2005 | Husain et al. |
| 2005/0082107 A1 | 4/2005 | Husain et al. |
| 2014/0150503 A1* | 6/2014 | Gweon ............. B60R 25/02153 70/183 |

(Continued)

FOREIGN PATENT DOCUMENTS

| JP | 10-217988 | 8/1998 |
| KR | 10-1836744 | 3/2018 |

OTHER PUBLICATIONS

Office Action dated Apr. 2, 2019 for Korean Application No. 10-2018-0025681 and its English machine translation by Google Translate.

(Continued)

*Primary Examiner* — Tan Q Nguyen
(74) *Attorney, Agent, or Firm* — Ladas & Parry, LLP

(57) ABSTRACT

An apparatus and a method for controlling steering of a vehicle can use an Electronic Steering Column Lock (ESCL) system to lock a steering wheel of a vehicle in a situation where a steering direction of a wheel of a vehicle cannot be further changed. The apparatus may comprise: a processor connected to the ESCL system; and memory storing executable instructions that, if executed by the processor, configure the processor to: receive information associated with a vehicle from at least one sensor associated with the vehicle; determine an obstacle condition, whether at least one vehicle wheel is obstructed, based on the information received from the sensor; determine a locking operation of a steering wheel, whether the steering wheel is to be locked, based on the determined obstacle condition; and generate an ESCL control signal for controlling the ESCL system based on the determined locking operation of the steering wheel.

16 Claims, 8 Drawing Sheets

(56) References Cited

U.S. PATENT DOCUMENTS

2015/0266449 A1* 9/2015 Laval ................ B60R 25/02153
                                                    74/89.16
2017/0096958 A1* 4/2017 Jiang .................... F02D 41/221
2017/0106904 A1* 4/2017 Hanson .................... B62D 6/10
2019/0009813 A1* 1/2019 Siskoy .................... B60R 16/03
2019/0138003 A1* 5/2019 Ming .................... B60W 50/14

OTHER PUBLICATIONS

Extended European Search Report dated Jun. 21, 2019 for European Application No. 18209362.5.

* cited by examiner

APPARATUS AND METHOD FOR CONTROLLING STEERING OF VEHICLE

CROSS REFERENCE TO RELATED APPLICATION

This application claims priority to Korean Patent Application No. 10-2018-0025681, filed on Mar. 5, 2018, which is hereby incorporated by reference for all purposes as if fully set forth herein.

BACKGROUND

1. Technical Field

Some embodiments of the present disclosure relate to an apparatus and a method for controlling steering of a vehicle and, more particularly, to technology which use an Electronic Steering Column Lock (ESCL) system to lock a steering wheel of a vehicle in a situation where a steering direction of a wheel of a vehicle cannot be further changed due to an obstacle.

2. Description of the Related Art

A Steer By Wire (SBW) system may not include a mechanical connection between a steering column and a rack bar. Instead, in the SBW system, a steering control signal generated in response to the rotation of a steering wheel may be transmitted to an actuator, which drives a steering direction of at least one wheel of a vehicle, so as to change a steering direction of the vehicle. However, in such a SBW system, a driver can rotate the steering wheel even when an object, such as a curbstone, blocks the change to a steering direction of the wheel of the vehicle. Therefore, the steering angle of the steering wheel may be different from the the angle of the vehicle wheel.

It is with respect to these and other general considerations that the following embodiments have been described. Also, although relatively specific problems have been discussed, it should be understood that the embodiments should not be limited to solving the specific problems identified in the Background.

SUMMARY

Various embodiments of the present disclosure may lock a steering wheel in a situation where a steering direction of a wheel of a vehicle cannot be changed.

Certain embodiments of the present disclosure lock a steering wheel of a vehicle in association with an ESCL system.

In accordance with an aspect of the present disclosure, there may be provided an apparatus for controlling steering of a vehicle. The apparatus may include: a vehicle information receiver configured to receive vehicle information on a vehicle from a vehicle sensor provided in the vehicle; an obstacle condition determiner configured to determine an obstacle condition on which steering of the vehicle is obstructed, on the basis of the vehicle information; a steering wheel lock determiner configured to determine whether a steering wheel is to be locked, on the basis of a determination result of the obstacle condition; and an Electronic Steering Column Lock (ESCL) controller configured to generate an ESCL control signal for controlling an ESCL system on the basis of a determination result of whether the steering wheel is to be locked.

In accordance with another aspect of the present disclosure, there may be provided a method for controlling steering of a vehicle. The method may include: receiving vehicle information on a vehicle from a vehicle sensor provided in the vehicle; determining an obstacle condition on which steering of the vehicle is obstructed, on the basis of the vehicle information; determining whether a steering wheel is to be locked, on the basis of a determination result of the obstacle condition; and generating an ESCL control signal for controlling an ESCL system on the basis of a determination result of whether the steering wheel is to be locked.

According to some exemplary embodiments of the present disclosure, an apparatus for controlling steering of a vehicle may comprise: at least one processor connected to an Electronic Steering Column Lock (ESCL) system; and at least one memory storing executable instructions that, if executed by the processor, configure the processor to: receive information associated with a vehicle from at least one sensor associated with the vehicle; determine an obstacle condition, whether at least one vehicle wheel is obstructed, based on the information received from the at least one sensor; determine a locking operation of a steering wheel, whether the steering wheel is to be locked, based on the determined obstacle condition; and generate an ESCL control signal for controlling the ESCL system based on the determined locking operation of the steering wheel.

According to certain exemplary embodiments of the present disclosure, a method for controlling steering of a vehicle in a steering system, comprising at least one processor connected to an Electronic Steering Column Lock (ESCL) system and at least one memory comprising instructions executed by the processor, may comprise: receiving information associated with a vehicle from at least one sensor associated with the vehicle; determining an obstacle condition, whether at least one vehicle wheel is obstructed, based on the information received from the at least one sensor; determining a locking operation of a steering wheel, whether the steering wheel is to be locked, based on the determined obstacle condition; and generating an ESCL control signal for controlling the ESCL system based on the determined locking operation of the steering wheel.

According to some embodiments of the present disclosure, a steering wheel can be locked in a situation where a steering direction of at least one vehicle wheel cannot be changed, and a driver of a vehicle may receive notification that there is an obstacle which obstructs steering.

According to certain embodiments of the present disclosure, a steering wheel of a vehicle can be locked using the ESCL system in a situation where a steering direction of at least one vehicle wheel cannot be changed, so as to, without the need for installing a separate and additional apparatus for locking the steering wheel, and may output, to a driver of a vehicle, notification that there is an obstacle which obstructs steering.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
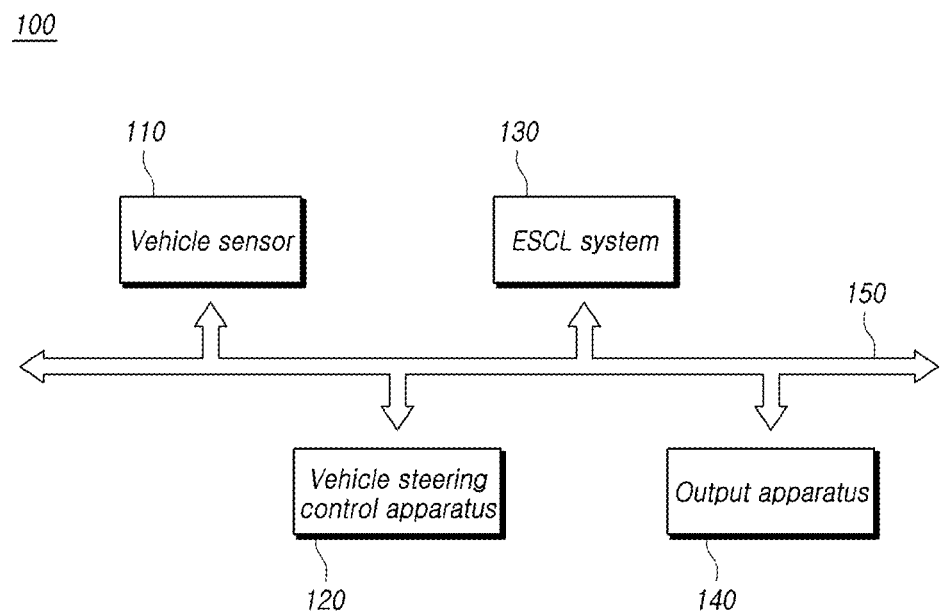
FIG. 1 is a block diagram illustrating a configuration of a vehicle steering control system according to an embodiment of the present disclosure.

The present disclosure may have various modifications and embodiments, and thus particular embodiments illustrated in the drawings will be described in detail in the following description. However, it should be understood that there is no intent to limit the present disclosure to the particular forms disclosed, but on the contrary, the present disclosure covers all modifications, equivalents, and alternatives falling within the spirit and scope of the disclosure. In the description of the present disclosure, when it is determined that the detailed description of the related well-known technologies unnecessarily make the subject matter of the present disclosure unclear, the detailed description will be omitted. Also, a singular expression as used in the specification and the claims should be construed as meaning "one or more" unless indicated otherwise.

Hereinafter, embodiments of the present disclosure will be described in detail with reference to the accompanying drawings, and in the description made with reference to the accompanying drawings, the same or corresponding elements have the same reference numeral, and a duplicate description therefor will be omitted.

FIG. 1 is a block diagram illustrating a configuration of a vehicle steering control system according to an embodiment of the present disclosure.

Referring to FIG. 1, a vehicle steering control system 100 may include a vehicle sensor 110, a vehicle steering control apparatus 120, an Electronic Steering Column Lock (ESCL) system 130, an output apparatus o unit 140, and a communication path 150.

The vehicle sensor 110 may include one or more sensors mounted at or associated with a vehicle and may be configured to signify the sensors. The vehicle sensor 100 can include all types of sensors capable of sensing vehicle information, that is, information which may be used to check a state of the vehicle. The vehicle sensor 110 may transmit the sensed vehicle information to the vehicle steering control apparatus 120. Fo example, the vehicle information may include information on an angle of a steering wheel and information on a steering angle of a vehicle wheel.

In some exemplary embodiments, the vehicle sensor 110 may comprise a sensor, for example, but not limited to, a steering angle sensor, configured to sense angle information of the steering wheel. Also, the vehicle sensor 110 may sense vehicle information which can correspond to an angle of a steering wheel, such as an angle of a steering column, and may output the sensed vehicle information to the vehicle steering control apparatus 120.

The vehicle sensor 110 may include a sensor configured to sense a steering angle of the vehicle wheel. For instance, the vehicle sensor 110 may include a linear angle sensor configured to sense the displacement of a rack bar, a pinion angle sensor configured to sense an angle of a pinion, and the like. The vehicle sensor 110 may sense vehicle information corresponding to the steering angle of the vehicle wheel, and may transmit the sensed vehicle information to the vehicle steering control apparatus 120.

The vehicle sensor 110 may include a current sensor configured to sense a current flowing through a motor configured to deliver dynamic force to a rack bar through a pinion. The vehicle sensor 110 may sense the current flowing through the motor, and may output the sensed current information of the motor to the vehicle steering control apparatus 120.

In certain exemplary embodiments, the vehicle sensor 110 may sense vehicle information at a pre-configured time interval, or periodically or aperiodically, and may deliver the sensed vehicle information to the vehicle steering control apparatus 120. Alternatively, in response to a request from the vehicle steering control apparatus 120, the vehicle sensor 110 may deliver vehicle information to the vehicle steering control apparatus 120.

The vehicle steering control apparatus 120 may be configured to control rotation locking of the steering wheel. Specifically, the vehicle steering control apparatus 120 may receive the vehicle information from the vehicle sensor 110. The vehicle steering control apparatus 120 may determine whether the steering wheel is to be locked, on the basis of the received vehicle information. The vehicle steering control apparatus 120 may generate an ESCL control signal for controlling the ESCL system 130 on the basis of the determination result of whether the steering wheel is to be locked. The vehicle steering control apparatus 120 may transmit the generated ESCL control signal to the ESCL system 130. Hereinafter, a detailed description of exemplary embodiments of this configuration will be made below with reference to FIGS. 2 to 7.

The ESCL system 130 may be a steering wheel lock system provided in a vehicle, and may control locking or unlocking of a steering column. The ESCL system 130 may comprise a motor and an Electronic Control Unit (ECU), which are embedded therein, so as to make it possible to electronically lock or unlock a steering wheel.

In order to prevent the unauthorized use of a vehicle, the ESCL system 130 may typically lock a steering column. After or when a driver gets into the vehicle, the ESCL system 130 may check whether an Smark Key (SMK) is a normal SMK, which matches the vehicle, for example, but not limited to, whether the SMK is authorized for the vehicle, through encrypted data serial communication (e.g. Controller Area Network (CAN) & Local Interconnect Network (LIN), etc.) between a SMK ECU and the ESCL system 130. When the SMK is determined to be a normal SMK, the ESCL system 130 releases the locking of the steering column by using an unlocking message transmitted from an SMK unit. Then, the driver may start up the vehicle. When the driver finishes driving the vehicle and turns off the ignition, if an SMK is determined to be a normal SMK through the encrypted data serial communication, the ESCL system 130 may lock the steering column.

According to an exemplary embodiment of the present disclosure, on an obstacle condition, for example, in a case where at least one vehicle wheel contacts a curbstone or the like which obstructs the steering of a vehicle, the ESCL system 130 may operate in association with the vehicle steering control apparatus 120. The ESCL system 130 may receive an ESCL control signal from the vehicle steering control apparatus 120. The ESCL system 130 may lock the rotation or release the locking of a steering wheel according to the received ESCL control signal.

An output apparatus or unit 140 may include, for example, but not limited to, a display device, an audio device, a haptic device and any output device which is mounted on or at a vehicle. The output apparatus 140 may provide an output signal so that a driver can recognize an operating state of the vehicle steering control system 100 through the driver's visual sense, auditory sense, tactile sense, and the like. For example, the output apparatus or unit 140 may output information, including locking of a steering wheel, release of the locking of the steering wheel, and the like.

The communication path 150 may be implemented with all types of vehicle communication devices and methods, including wired and/or wireless communication devices, CAN and the like. The communication path 150 may be configured to mutually connect the vehicle sensor 110, the vehicle steering control apparatus 120, the ESCL system 130, the output apparatus or unit 140, and the like which included in or associated with the vehicle steering control system 100.

According to some exemplary embodiments, in a situation where a steering direction of a vehicle wheel cannot be changed or rotated, a steering wheel of a vehicle may be locked using the ESCL system provided in the vehicle, so as to, without the need for installing a separate and additional apparatus for locking the steering wheel, make it possible to notify a driver of the vehicle that there is an obstacle which obstructs the steering.

Figure 2:
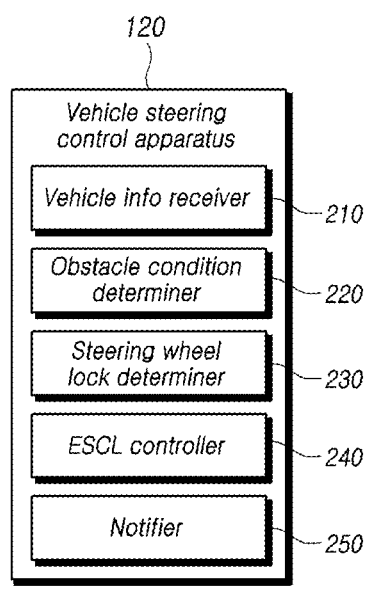
FIG. 2 is a block diagram illustrating a configuration of a vehicle steering control apparatus according to an embodiment of the present disclosure.

FIG. 2 is a block diagram illustrating a configuration of a vehicle steering control apparatus according to an embodiment of the present disclosure.

Referring to FIG. 2, a vehicle steering control apparatus 120 may include a vehicle information receiver or vehicle information receiving module 210, an obstacle condition determiner or obstacle condition determining module 220, a steering wheel lock determiner or steering wheel lock deterrminng module 230, an ESCL controller 240, and a notifier 250.

The vehicle information receiver 210 may be configured to receive vehicle information from one or more sensors associated with a vehicle, such as the vehicle sensor 110 of FIG. 1. For instance, the vehicle information receiver 210 may receive, from the vehicle sensor 110 of FIG. 1, vehicle information which can be used to determine an obstacle condition. The vehicle information may include, for example, but not limited to, an angle of a steering wheel and a steering angle of a vehicle wheel. The vehicle information receiver 210 may be, for example, but not limited to, a terminal receiving information, data or signal.

The obstacle condition determiner 220 may be configured to determine whether the vehicle information received by the vehicle information receiver 210 corespond to a relevant situation in which a steering direction of a wheel of a vehicle cannot be changed or rotated due to an obstacle. For example, the obstacle may be a curbstone. However, this is only an example, and thus, the present disclosure is not limited thereto. The obstacle may be any object, for example, but not limited to, a particular object placed on a road, a curbstone, or a topography object such as a puddle, which may tightly contact the wheel of the vehicle and may obstruct the steering of the vehicle.

In an example, when a difference between an angle of a steering wheel and a steering angle of a vehicle wheel is greater than or equal to a predetermined value, the obstacle condition determiner 220 may determine that this case corresponds to an obstacle condition. In another example, the obstacle condition determiner 220 may determine whether a current condition of the vehicle corresponds to an obstacle condition, on the basis of vehicle information related to an angle of a steering wheel and a steering angle of a wheel.

In an exemplary embodiment, the obstacle condition determiner 220 may receive information on, indicative of or related to an angle of a steering wheel and/or an angle of a pinion. When the difference between the angle of the steering wheel and the angle of the pinion is greater than or equal to a predetermined value, the obstacle condition determiner 220 may determine that there is an obstacle which obstructs the steering of at least one vehicle wheel.

In another exemplary embodiment, the obstacle condition determiner 220 may receive information on, indicative of or related to an angle of a steering wheel and displacement of a rack bar. When the difference between the received displacement of the rack bar and displacement of a rack bar corresponding to the angle of the steering wheel is greater than or equal to a predetermined value, the obstacle condition determiner 220 may determine that there is an obstacle which obstructs the steering of at least one vehicle wheel.

In still another exemplary embodiment, the obstacle condition determiner 220 may receive information on, indicative of or related to an angle of a steering wheel and a current flowing through a motor connected to a pinion. When the current flowing through the motor is detected to have a maximum value while the angle of the steering wheel is changed, the obstacle condition determiner 220 may determine that there is an obstacle which obstructs the steering of a wheel.

The obstacle condition determiner 220 may receive the sensed vehicle information at each predetermined time interval from the vehicle sensor 110, and may determine an obstacle condition for each received vehicle information.

The steering wheel lock determiner 230 may be configured to determine whether a steering wheel is to be locked. For instance, when a difference between an angle of a steering wheel and a steering angle of a vehicle wheel continuously increases after the difference corresponds to an obstacle condition, or when the defference between the angle of the steering wheel and the steering angle of the vehicle wheel is over a predetermined value corresponding to the obstacle condition, the steering wheel lock determiner 230 may determine that the steering wheel is to be locked.

In an exemplary embodiment, the steering wheel lock determiner 230 may determine that the rotation of the steering wheel is to be locked in a direction in which the difference between the angle of the steering wheel and the steering angle of the vehicle wheel increases. For example, when the steering angle of the vehicle wheel is not changed while the steering wheel continuously rotates in the clockwise direction, the difference between the angle of the steering wheel and the steering angle of the vehicle wheel gradually increases. When the difference therebetween becomes greater than or equal to a predetermined value, the steering wheel lock determiner 230 may determine that the rotation of the steering wheel in the clockwise direction is to be locked.

In another exemplary embodiment, when the difference between the angle of the steering wheel and the steering angle of the vehicle wheel becomes less than a predetermined value in a state where the rotation of the steering wheel is locked, the steering wheel lock determiner 230 may determine that the locking of the steering wheel is to be released. For example, when the steering wheel rotates in the counterclockwise direction in a state where the rotation of the steering wheel in the clockwise direction is locked, the difference between the angle of the steering wheel and the steering angle of the vehicle wheel is gradually reduced. When the difference therebetween becomes less than or equal to a predetermined value, the steering wheel lock determiner 230 may determine that the locking of the rotation of the steering wheel in the clockwise direction is to be released.

The ESCL controller 240 may be configured to generate an ESCL control signal for controlling an ESCL to lock a steering wheel or release the locking of the steering wheel. For example, when it is determined that the steering wheel is to be locked, the ESCL controller 240 may generate an ESCL control signal for controlling the ESCL to lock the steering wheel. When it is determined that the locking of the steering wheel is to be released, the ESCL controller 240 may generate an ESCL control signal for controlling an ESCL to release the locking of the steering wheel.

The notifier 250 may be configured to control the output apparatus or unit 140 of FIG. 1 and to provide an output signal so that a driver can recognize an operating state of the vehicle steering control system 100, including an obstacle condition, locking of the steering wheel, the release of the locking of the steering wheel, and the like.

In some embodiments of the present disclosure, in a situation where a steering direction of a vehicle wheel cannot be changed, a steering wheel of a vehicle can be locked using an ESCL system provided in the vehicle, so as to, without the need for installing a separate and additional apparatus for locking the steering wheel, make it possible to notify a driver of the vehicle that there is an obstacle which obstructs steering.

Figure 3:
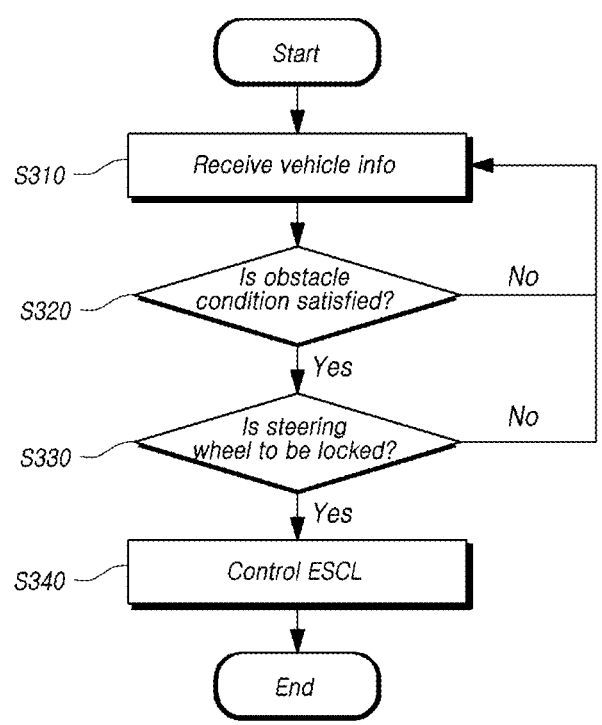
FIG. 3 is a flowchart illustrating a vehicle steering control method according to an embodiment of the present disclosure.

FIG. 3 is a flowchart illustrating a vehicle steering control method according to an embodiment of the present disclosure. FIGS. 4 to 7 are flowcharts and a diagram for showing vehicle steering control on an obstacle condition according to embodiments of the present disclosure.

Hereinafter, a description will be made of an example in which the method is performed by the vehicle steering control apparatus 120 illustrated in FIG. 1 or 2, and the description of the vehicle steering control apparatus 120 in the present disclosure can be applied to the methods described herein.

In operation S310, the vehicle steering control apparatus 120 may receive, from the vehicle sensor 110, vehicle information including an angle of a steering wheel and a steering angle of a vehicle wheel.

In operation S320, the vehicle steering control apparatus 120 may determine whether a current or relevant condition of a vehicle corresponds to an obstacle condition, on the basis of the vehicle information received from the vehicle sensor 110. When it is determined that the current or relevant condition of the vehicle does not correspond to the obstacle condition, the vehicle steering control apparatus 120 may perform operation S310 of receiving vehicle information repeatedly.

Figure 4:
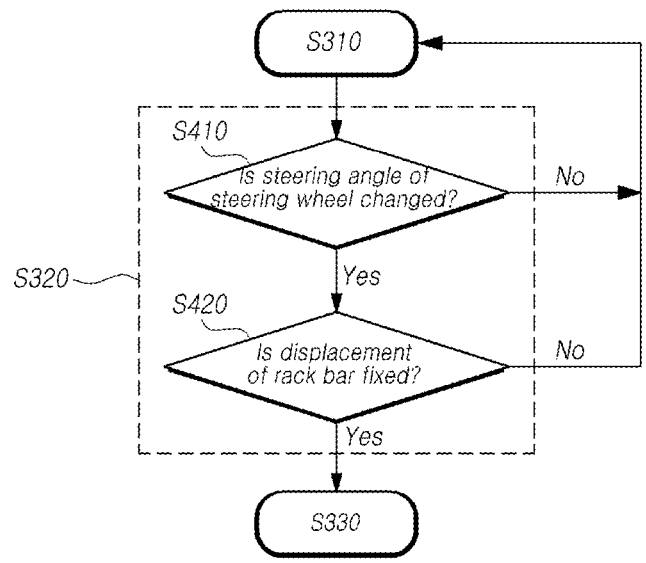
FIGS. 4 to 7 are flowcharts and a diagram for illustrating vehicle steering control on an obstacle condition according to embodiments of the present disclosure.

FIG. 4 illustrates a flow chart of an operation S320 of determining whether a current or relevant condition of a vehicle corresponds to an obstacle condition according to an exemplary embodiment of the present disclosure. The vehicle steering control apparatus 120 may determine whether the current or relevant condition of the vehicle corresponds to the obstacle condition, on the basis of vehicle information including, for example, but not limited to, an angle of a steering wheel and a steering angle of a vehicle wheel. Further, the vehicle information may comprise displacement of a rack bar In operation S410, the vehicle steering control apparatus 120 may determine whether the received angle of the steering wheel is changed. When the steering angle of the steering wheel is not changed, the vehicle steering control apparatus 120 may determine that the current or relevant condition of the vehicle does not correspond to an obstacle condition, and then may perform operation S310 of receiving the vehicle information.

When the steering angle of the steering wheel is changed, in operation S420, the vehicle steering control apparatus 120 may determine whether a rack bar is displaced or fixed. When the rack bar is being displaced or moved, the vehicle steering control apparatus 120 may determine that the current or relevant condition of the vehicle does not correspond to an obstacle condition, and then may perform operation S310 of receiving the vehicle information.

When, a difference between the received displacement of the rack bar and a reference displacement of a rack bar corresponding to the received angle of the steering wheel is greater than or equal to a predetermined value, the vehicle steering control apparatus 120 may determine that there is an obstacle which obstructs the steering of at least one vehicle wheel. For example, the received displacement of the rack bar and the received angle of the steering wheel are included in the vehicle information. The reference displacement of the rack bar can be estimated or calculated, for example, but not limited to, by using a look-up table or algorithm stored in memory or a processor of the vehicle steering control apparatus 120.

Figure 7:
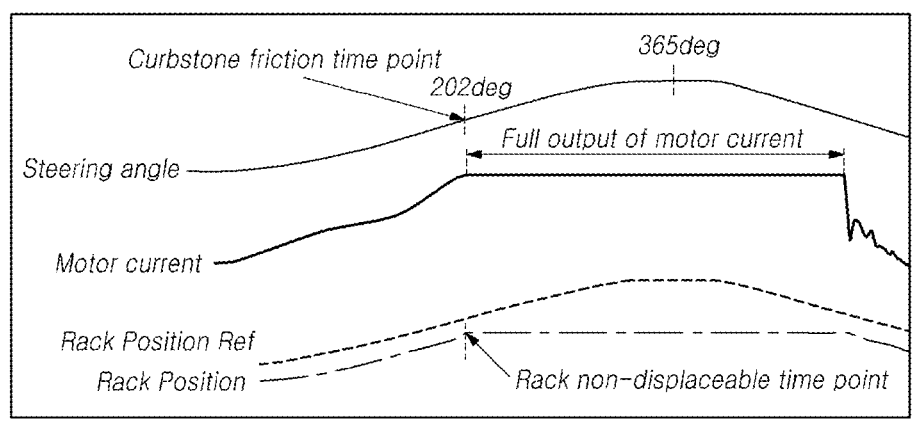

For example, referring to FIG. 7, friction with a curbstone, that is, an obstacle, blocks the rotation of at least one vehicle wheel when a steering angle of the steering wheel rotates more than 202 degrees. Therefore, a displacement of the rack bar (i.e., a Rack Position) cannot not increased from 202 degrees, regardless of the increase in the steering angle of the steering angle. However, as the steering angle of the steering wheel continuously increases toward 365 degrees, the reference displacement (i.e., a Rack Position Ref) of the rack bar corresponding to the steering angle of the steering wheel increases together with the steering angle of the steering wheel. When a difference between the Rack Position and the Rack Position Ref becomes greater than a predetermined value, the vehicle steering control apparatus 120 may determine that an obstacle exists (for example, but not limited to, an obstacle blocks the rotation of at least one vehicle wheel, or an obstacle contacts at least one vehicle wheel).

When the obstacle is determined to exist, the vehicle steering control apparatus 120 may perform operation S330 of FIG. 3.

Figure 5:
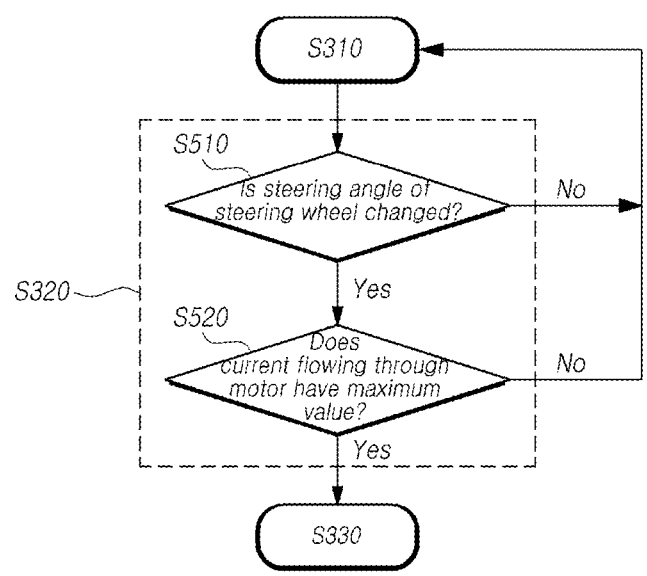

FIG. 5 illustrates a flow chart of operation S320 of determining whether a current or relevant condition of a vehicle corresponds to an obstacle condition according to another exemplary embodiment of the present disclosure. In operation S510, the vehicle steering control apparatus 120 may determine whether the angle of a steering wheel received from the vechicle sensor 110 is changed. When the steering angle of the steering wheel is not changed, the vehicle steering control apparatus 120 may determine that the current or relevant condition of the vehicle does not correspond to the obstacle condition, and then may perform operation S310 of receiving vehicle information repeatedly.

When the steering angle of the steering wheel is changed, in operation S520, the vehicle steering control apparatus 120 may determine whether a current flowing through a motor connected to a pinion is detected to have a maximum value. When the current flowing through the motor does not have the maximum value, the vehicle steering control apparatus 120 may determine that the current or relevant condition of the vehicle does not correspond to the obstacle condition, and then may perform operation S310 of receiving the vehicle information.

When the current flowing through the motor is continuously detected to have the maximum value while the steering angle of the steering wheel is changed, the vehicle steering control apparatus 120 may determine that there is an obstacle which obstructs the steering of at least one vehicle wheel.

For example, referring to FIG. 7, friction with a curbstone, that is, an obstacle, blocks the rotation of at least one vehicle wheel occurs when a steering angle of the steering wheel rotates more than 202 degrees. Therefore, a displacement of a rack bar (i.e., a Rack Position) cannot be not increased more than 202 degrees, regardless of an increase in the steering angle of the steering wheel. However, as the steering angle of the steering wheel continuously increases from 202 degrees toward 365 degrees, a control command indicating the movement of the rack bar may be continuously generated. Nevertheless, the rack bar cannot not moved because of the obstable contacting the vehicle wheel, and thus a maximum current is continuously supplied to a motor connected to a pinion to move the rack bar. When a current flowing through the motor is detected to have the maximum value while the steering angle increases, the vehicle steering control apparatus 120 may determine that an obstacle exists (for example, but not limited to, an obstacle blocks the rotation of at least one vehicle wheel, or an obstacle contacts at least one vehicle wheel).

Figure 6:
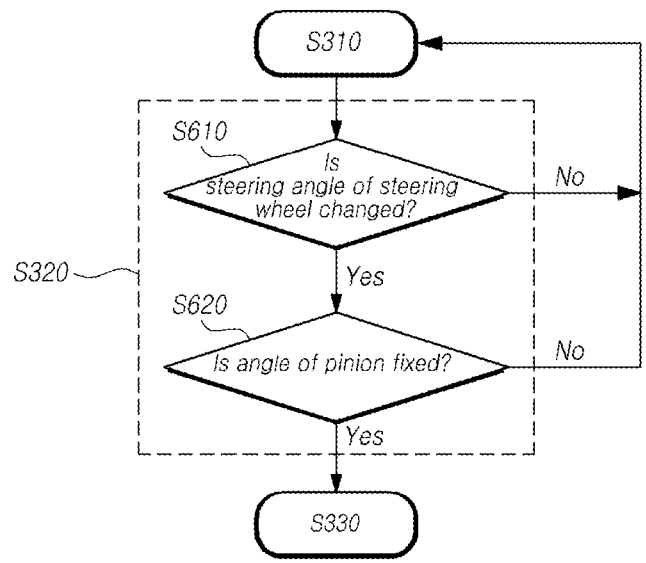

When the obstacle is determined to exist, the vehicle steering control apparatus 120 may perform operation S330 of FIG. 3. FIG. 6 illustrates a flow chart of operation S320 of determining whether a current or relevant condition of a vehicle corresponds to an obstacle condition according to still another exemplary embodiment. In operation S610, the vehicle steering control apparatus 120 may determine whether the angle of a steering wheel received from the vehicle sensor 110 is changed. When the steering angle of the steering wheel is not changed, the vehicle steering control apparatus 120 may determine that the currebnt or relevant condition of the vehicle does not correspond to an obstacle condition, and then may perform operation S310 of receiving vehicle information repeatedly.

When the steering angle of the steering wheel is changed, in operation S620, the vehicle steering control apparatus 120 may determine whether the angle of a pinion received from the vehicle sensor 110 is fixed or is not moved. When the received angle of the pinion is being changed, the vehicle steering control apparatus 120 may determine that the current or relevant condition of the vehicle does not correspond to an obstacle condition, and then may perform operation S310 of receiving the vehicle information including the steering angle of the steering wheel and the angle of the pinion.

When a difference between the angle of the pinion and the steering angle of the steering wheel is greater than or equal to a predetermined value, the vehicle steering control apparatus 120 may determine that there is an obstacle which obstructs the steering of at least one vehicle wheel. When the obstacle is determined to exist, the vehicle steering control apparatus 120 may perform operation S330 of FIG. 3.

Referring again to FIG. 3, in operation S330, the vehicle steering control apparatus 120 may determine whether the steering wheel is to be locked. For instance, when the current or relevant condition of the vehicle corresponds to an obstacle condition, the vehicle steering control apparatus 120 may determine whether a difference between an angle of the steering wheel and a steering angle of the vehicle wheel becomes greater than a predetermined value. When the difference therebetween becomes greater than the predetermined value, the vehicle steering control apparatus 120 may determine that the steering wheel is to be locked.

In operation S340, the vehicle steering control apparatus 120 may be configured to control the ESCL system 130. For example, when it is determined that the steering wheel is to be locked, the vehicle steering control apparatus 120 may generate an ESCL control signal for controlling the ESCL system 130, and may output the ESCL control signal to the ESCL system 130. The ESCL system 130 may configured to perform the ESCL control, for example, but not limited to, locking a vehicle wheel or release the locking of the vehicle wheel according to the ESCL control signal. By this configuration, in a situation where a steering direction of a vehicle wheel cannot be changed, a steering wheel of a vehicle can be locked using the ESCL system provided in the vehicle, so as to, without the need for installing a separate and additional apparatus for locking the steering wheel of the vehicle, make it possible to notify a driver of the vehicle that there is an obstacle which obstructs steering.

Figure 8:
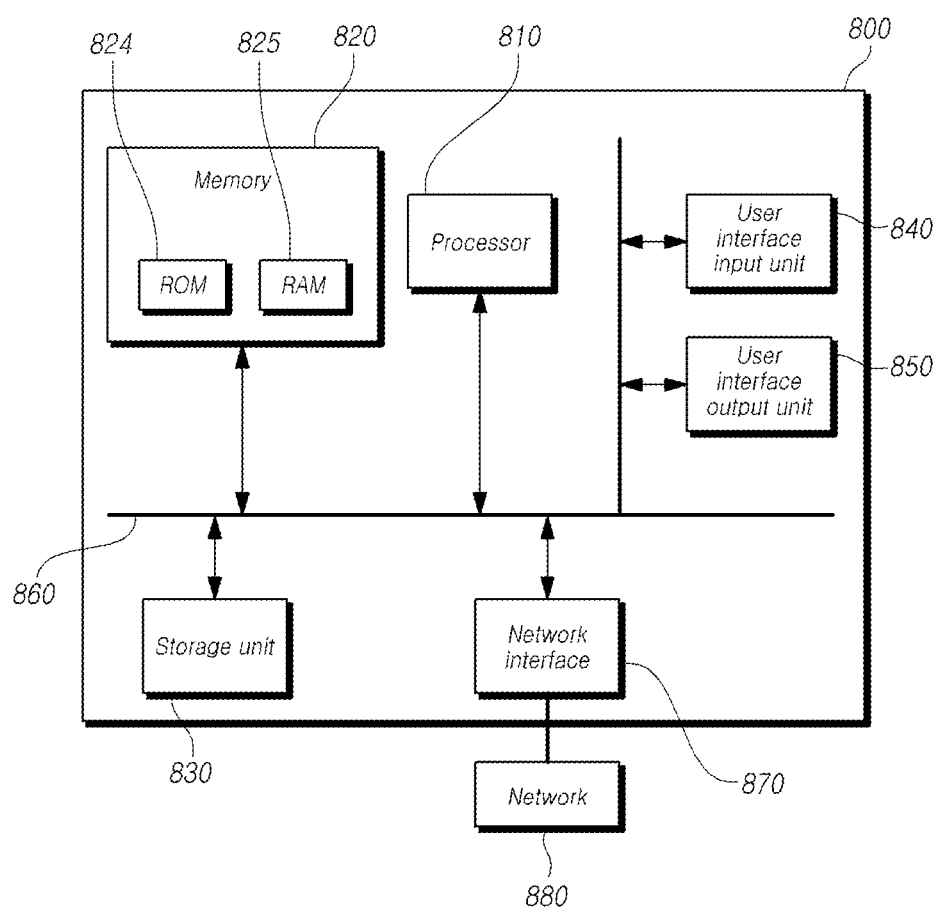
FIG. 8 is a block diagram illustrating a configuration of a vehicle steering control apparatus according to an embodiment of the present disclosure.

FIG. 8 is a block diagram illustrating a configuration of a vehicle steering control apparatus according to an embodiment of the present disclosure.

As illustrated in FIG. 8, a computer system 800, for example, the vehicle steering control apparatus 120 or one or more elements of the vehicle steering control apparatus 120, may include one or more of at least one processor 810, a memory 820, a storage unit 830, a user interface input unit 840, and a user interface output unit 850, which can communicate with each other through a bus 860. Additionally, the methods of FIGS. 3-7 may be performed by the computer system 800 of FIG. 8. Further, the computer system 800 may also include a network interface 870 configured to connect the computer system 800 to a network 880. The processor 810 may be a central processing unit (CPU) or at least one semiconductor element or module configured to execute one or more processing instructions stored in the memory 820 and/or the storage unit 830. Examples of the memory 820 and the storage unit 830 may include various types of volatile/non-volatile memory media. Examples of the memory 820 may include a Read-Only Memory (ROM) 824 and a Random Access Memory (RAM) 825.

A method and an apparatus according to an embodiment of the present disclosure may be implemented in the form of program commands executable through various computer means, wherein the program commands are recordable in a computer-readable medium. The computer-readable medium may include a program command, a data file, a data structure, and the like independently or in combination.

The aforementioned hardware device may be configured to operate as one or more software modules in order to perform the operation of the present disclosure, and vice versa.

The present disclosure has been described above in connection with the embodiments thereof. It will be understood by those skilled in the art to which the present disclosure belongs that the present disclosure may be implemented in modified forms without departing from the essential characteristics of the present disclosure. Therefore, the embodiments disclosed herein should be considered from an illustrative point of view, rather than a limitative point of view. The scope of the present disclosure is found not in the above description but in the accompanying claims, and all differences falling within the scope equivalent to the claims should be construed as being included in the present disclosure.

What is claimed is:

1. An apparatus for controlling steering of a vehicle, the apparatus comprising:
    at least one processor connected to an Electronic Steering Column Lock (ESCL) system; and
    at least one memory storing executable instructions that, if executed by the processor, configure the processor to:
        receive information associated with a vehicle from at least one sensor associated with the vehicle;
        determine an obstacle condition, whether at least one vehicle wheel is obstructed, based on the information received from the at least one sensor;
        determine a locking operation of a steering wheel, whether the steering wheel is to be locked, based on the determined obstacle condition; and
        generate an ESCL control signal for controlling the ESCL system based on the determined locking operation of the steering wheel,
    wherein:
    the information associated with the vehicle comprises information related to an angle of the steering wheel and an angle of the at least one vehicle wheel; and
    the processor is configured to determine the obstacle condition based on a difference between the angle of the steering wheel and the angle of the at least one vehicle wheel.

2. The apparatus of claim 1, wherein the ESCL system is configured to lock the steering wheel when the at least one vehicle wheel is obstructed.

3. The apparatus of claim 1, wherein the information related to the angle of the steering wheel comprises a rotation angle of the steering wheel and/or a rotation angle of a steering column.

4. The apparatus of claim 1, wherein the information related to the angle of the at least one vehicle wheel comprises at least one of a steering angle of the at least one vehicle wheel, a displacement of a rack bar, and an angle of a pinion.

5. The apparatus of claim 1, wherein the processor is configured to:
    receive the information associated with the vehicle at a predetermined time interval;
    determine that the obstacle condition is satisfied, when the difference between the angle of the steering wheel and the angle of the at least one vehicle wheel is greater than or equal to a predetermined value; and
    determine that rotation of the steering wheel is to be locked, when the difference between the angle of the steering wheel and the angle of the at least one vehicle wheel at the predetermined time interval increases after the obstacle condition is satisfied.

6. The apparatus of claim 5, wherein the processor is configured to determine that the rotation of the steering wheel is to be locked in a direction in which the difference between the angle of the steering wheel and the angle of the at least one vehicle wheel increases.

7. The apparatus of claim 1, wherein:
    the information associated with the vehicle comprises information related to an angle of the steering wheel and a current of a motor connected to a pinion; and
    the processor is configured to determine that the obstacle condition is satisfied, when the current flowing through the motor is detected to have a predetermined value while the angle of the steering wheel is changed.

8. The apparatus of claim 1, wherein the processor is configured to, when the obstacle condition is satisfied, control a output device comprised in the vehicle to output notification regarding that the obstacle condition is satisfied.

9. A method for controlling steering of a vehicle in a steering system comprising at least one processor connected to an Electronic Steering Column Lock (ESCL) system and at least one memory comprising instructions executed by the processor, the method comprising:
    receiving information associated with a vehicle from at least one sensor associated with the vehicle;
    determining an obstacle condition, whether at least one vehicle wheel is obstructed, based on the information received from the at least one sensor;
    determining a locking operation of a steering wheel, whether the steering wheel is to be locked, based on the determined obstacle condition; and
    generating an ESCL control signal for controlling the ESCL system based on the determined locking operation of the steering wheel,
    wherein:
    the information associated with the vehicle comprises information related to an angle of the steering wheel and an angle of the at least one vehicle wheel; and
    the determining of the obstacle condition comprises determining whether the at least one vehicle wheel is obstructed based on a difference between the angle of the steering wheel and the angle of the at least one vehicle wheel.

10. The method of claim 9, wherein the ESCL system locks the steering wheel when the at least one vehicle wheel is obstructed.

11. The method of claim 9, wherein the information related to the angle of the steering wheel comprises a rotation angle of the steering wheel and/or a rotation angle of a steering column.

12. The method of claim 9, wherein the information related to the angle of the at least one vehicle wheel comprises at least one of a steering angle of the at least one vehicle wheel, a displacement of a rack bar, and an angle of a pinion.

13. The method of claim 9, wherein:
    the receiving of the vehicle information comprises receiving the information associated with the vehicle at a predetermined time interval;
    the determining of the obstacle condition comprises determining that the obstacle condition is satisfied, when the difference between the angle of the steering wheel and the angle of the at least one vehicle wheel is greater than or equal to a predetermined value; and
    the determining of the locking operation of the steering wheel comprises determining that rotation of the steering wheel is to be locked, when the difference between the angle of the steering wheel and the angle of the at least one vehicle wheel at the predetermined time interval increases after the obstacle condition is satisfied.

14. The method of claim 13, wherein the determining of the locking operation of the steering wheel comprises determining that the rotation of the steering wheel is to be locked in a direction in which the difference between the angle of the steering wheel and the angle of the at least one vehicle wheel increases.

15. The method of claim 9, wherein:
    the information associated with the vehicle comprises information related to an angle of the steering wheel and a current of a motor connected to a pinion; and
    the determining of the obstacle condition comprises determining that the obstacle condition is satisfied, when the current flowing through the motor is detected to have a predetermined value while the angle of the steering wheel is changed.

16. The method of claim 9, further comprising outputting, by a output device, notification regarding that the obstacle condition is satisfied, when the obstacle condition is satisfied.

* * * * *